United States Patent
Bodnar

(10) Patent No.: US 8,155,657 B2
(45) Date of Patent: Apr. 10, 2012

(54) DYNAMIC ROUTING

(75) Inventor: Guillermo Bodnar, Chantilly, VA (US)

(73) Assignee: AIP Acquisition, LLC, Fort Lee, NJ (US)

( * ) Notice: Subject to any disclaimer, the term of this patent is extended or adjusted under 35 U.S.C. 154(b) by 1066 days.

(21) Appl. No.: 11/978,269

(22) Filed: Oct. 29, 2007

(65) Prior Publication Data

US 2008/0102851 A1 May 1, 2008

Related U.S. Application Data

(60) Provisional application No. 60/855,030, filed on Oct. 27, 2006.

(51) Int. Cl.
*H04W 72/00* (2009.01)
(52) U.S. Cl. .................. 455/452.2; 455/423; 455/67.11; 455/403; 455/518; 455/453
(58) Field of Classification Search ............... 455/554.2, 455/452.2, 403, 422.1, 428, 518, 453, 67.11; 370/310, 332
See application file for complete search history.

(56) References Cited

U.S. PATENT DOCUMENTS

| | | | |
|---|---|---|---|
| 6,078,805 A * | 6/2000 | Scott | 455/406 |
| 6,625,268 B1 * | 9/2003 | Wallenius | 379/114.28 |
| 7,233,908 B1 * | 6/2007 | Nelson | 705/10 |
| 7,529,225 B2 * | 5/2009 | Joseph et al. | 370/352 |
| 7,707,173 B2 * | 4/2010 | Nanavati et al. | 707/608 |
| 2006/0079238 A1 * | 4/2006 | Liu et al. | 455/445 |
| 2006/0111079 A1 * | 5/2006 | Tischer et al. | 455/406 |
| 2006/0126651 A1 * | 6/2006 | Yu | 370/404 |
| 2008/0031277 A1 * | 2/2008 | Walter et al. | 370/469 |
| 2008/0057917 A1 * | 3/2008 | Oria | 455/414.1 |

* cited by examiner

Primary Examiner — Kamran Afshar
Assistant Examiner — Edward Zhang
(74) Attorney, Agent, or Firm — Cozen O'Connor

(57) ABSTRACT

A method for managing transactions across a large number of service providers includes determining performance metrics associated with each of a plurality of service providers and generating a score for each service provider based on the performance metrics associated with each of the plurality of service providers taken over a short time period. The service providers are then sorted based on the scores to generate a list of service providers. Customer transactions are then assigned to one of the service providers based on the order of the list of service providers. The list of service providers is reprioritized based on mid-term metrics and accumulated costs taken over a mid-term period that is longer than the short term period.

18 Claims, 4 Drawing Sheets

DYNAMIC ROUTING

CROSS REFERENCE TO RELATED APPLICATIONS

This application claims priority from U.S. Provisional Patent Application Ser. No. 60/855,030 which was filed on Oct. 27, 2006.

BACKGROUND OF THE INVENTION

1. Field of the Invention

The present invention relates to a method for dynamically routing network traffic. More specifically, the present invention is related to a method for managing telecommunications traffic.

2. Description of the Related Art

The industry related to transmitting and routing digital traffic is significantly fragmented. For example, in the telecommunications industry, deregulation and the development of new technologies (i.e., VoIP, WiMAX, UMTS, Video over IP) has led to an explosive growth in the number of service providers. Each offers a variety of services with different levels of quality and price ranges.

The providers typically have predefined agreements between them that are not completely evident to vendors which use the providers' services. A vendor will use heuristics in an attempt to determine whether a certain supplier's capabilities meet the vendor's requirements for completing a transaction. However, these heuristics are typically non-deterministic because the vendor does not have all the available information about the supplier's actual current capabilities. For example, a seller with a good quality history may now fail calls. Conversely, a seller that has had a quality problem in the past may now be performing well.

To illustrate the problem, FIG. 4 shows an example in which a vendor A has established relationships with suppliers B, C, and D. That is, the vendor A has negotiated agreements with suppliers B, C, and D that specify a commitment for quality, price, and/or capacity. However, vendor A does not have access to the internal network of C, i.e., the predefined agreements that C has with other suppliers. Thus, the decision by vendor A to include, e.g., supplier C in a certain order into a route plan is based on historical and outdated assumptions about the quality of service and price of supplier C.

By the time vendor A attempts to route a call through one of its providers, it is likely that the current downstream conditions may have changed from the conditions on which the vendor's decision is based. In the worst case, the conditions have changed such that the call is prevented from being routed. If the call does not go through, revenue is lost because the transaction is not completed.

Moreover, existing tools allow buyers to micromanage routes thus leading to market fragmentation and overflow. If a buyer pays to reserve a route for his use, others are prevented from using the route even though it may actually be available. Accordingly, the existing tools artificially limit the available supply to terminate a call even though potential sellers are available.

Because of the above problems, vendors (which may include companies and individuals) face significant challenges in their attempts to avoid revenue loss because they must attempt to manage real time business decisions based on outdated or inaccurate facts due to the dynamic, ever-changing, market conditions.

SUMMARY OF THE INVENTION

An object of the present invention is to provide a method for managing transactions with service providers such that existing service providers are leveraged to deliver the best available price and quality given current market conditions.

Another object of the present invention is to provide a method for managing telecommunication traffic with suppliers such that existing suppliers are leveraged to deliver the best available price and quality given current market conditions.

According to an embodiment of the invention, these and other objects are met by a method for managing transactions across a large number of service providers, including determining performance metrics associated with each of a plurality of service providers and generating a score for each service provider based on the performance metrics associated with each of the plurality of service providers taken over a short time period. The service providers are sorted based on the scores to generate an ordered list of service providers. A customer transaction is then assigned to one of the service providers based on the order of the list of service providers.

The collection of performance metrics is performed continuously by monitoring actual transactions.

According to another embodiment, the collected performance metrics of the service providers are stored over a longer period of time than the short time period in a mid term database. The list of service providers is then reprioritized based on the mid-term metrics and accumulated costs over the longer period of time to meet long term business goals.

The short time period is approximately 10-15 minutes and the mid term time period is about 3-5 hours.

The step of sorting the service providers includes determining whether all of the service providers have scores. If it is determined that not all of the service providers have scores, then the service providers without scores are prioritized based on optimized rules. The one of the service providers without scores that has the highest priority is given the first position in the list. The service providers with scores are added to the list from the highest score to the lowest score after the first position. Lastly, any remaining ones of the service providers without scores are added to the list after the service providers with scores.

In the step of assigning a service provider, successive attempts to perform the transaction are made with the service providers in the list until the transaction is completed by one of the service providers.

If the list is exhausted without completing the transaction, then the transaction is retried with a subset of service providers having a historical metric which meets a predetermined criteria.

In a specific embodiment, the transactions are telecommunications calls, and the performance metrics associated with each of a plurality of service providers comprise metrics for incoming and outgoing trunk groups associated with each of the plurality of service providers.

The steps of determining, generating, sorting, and assigning are accomplished by a service control point that is connected to a signal transfer point, wherein said step of assigning is effected by the signal transfer point.

According to another embodiment of the present invention, the object is also met by a signal control point connected to a signal transfer point that is connected to a plurality of service providers and customers. The signal control point comprises a performance collector module configured to monitor transactions performed by service providers through the signal transfer point and collect performance metrics associated with the service providers during the transaction, a score manager module configured to periodically generate a score for the service providers based on the collected metrics for every short time period, an optimizer module configured to generate an ordered list of the service providers based on the scores, and a processing module configured to assign transactions to one of the service providers based on the list.

The signal control point also includes a performance metrics database storing said collected metrics and a score database storing said scores.

The signal control point may additionally include a midterm metrics database storing historical metrics data.

A risk manager module is configured to reprioritize the list of service providers based on the historical metrics data and on accumulated costs for a time period, whereby a mixture of high performing and low performing service providers are used to achieve long term goals.

According to a specific embodiment, the transactions are telecommunications calls, and the performance metrics associated with each of a plurality of service providers comprise metrics for incoming and outgoing trunk groups associated with each of the plurality of service providers.

In that specific embodiment, the optimizer module is a route optimizer module for determining call routes and said processing module is a call processing module and is configured to assign call routes through service providers.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

The purpose of the present invention is to leverage existing service providers to deliver a service to a customer at the best available price and quality given current market conditions and to track recent measured performance against business goals. Performance metrics taken over a short period of time, i.e., 10 to 15 minutes, and stability of each of the metrics taken over a longer period of time, i.e., a few hours, are compared to business goals for quality and cost. The system blends low performing providers with high performing ones to achieve the desired goals of the customers. The mixing of the high and low providers that would not otherwise be considered allows more of the existing available capacity to be used to achieve the goals. The embodiments described below specifically relate to telecommunication service providers and their customers. However, the present invention may be applied to any service providers. It is further contemplated that the concept of the present invention may also be applied to stock trading where a customer specifies long term objective of the transaction and the system automatically places transactions at higher and lower costs until a desired blended cost is achieved.

Figure 1:
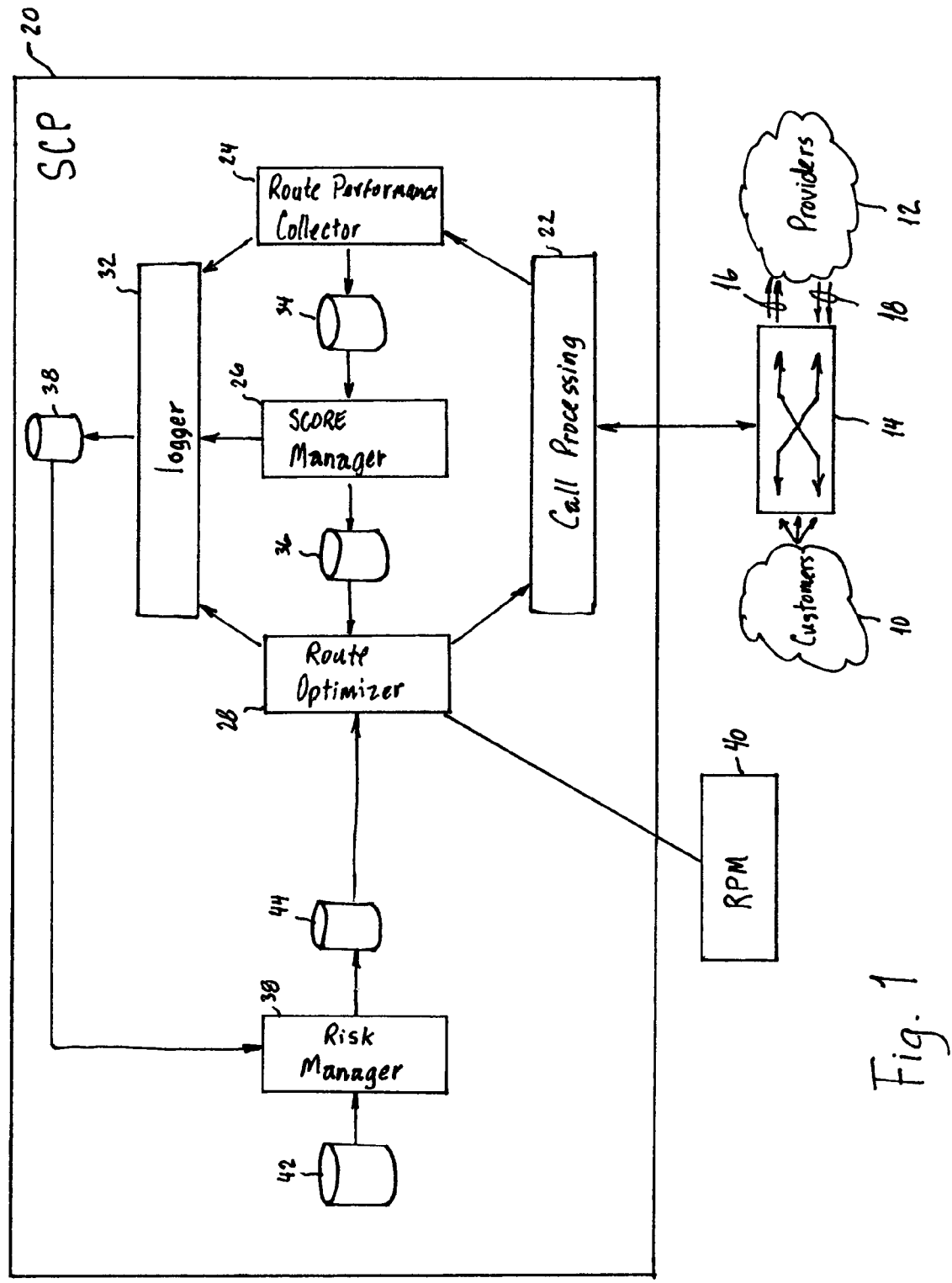
FIG. 1 is a schematic diagram of a signal control point according to an embodiment of the present invention.

FIG. 1 discloses a system for implementing dynamic routing according to an embodiment of the present invention. Customers 10 are connected to a switch 14 which connects the customer traffic to and from various service providers 12 through outgoing and incoming trunk groups 16, 18. The switch 14 may comprise any switch or multiplexing device which aggregates signals for further processing. According to the specific embodiment in which telecommunications traffic is routed to various service providers, the switch may be a signal transfer point (STP) in a standard SS7/C7 network. Alternatively, the switch may be a Session Border Controller, as is used in Voice over Internet Protocol (VoIP). The switch 14 is connected to a Service Control Point (SCP) 20. According to the embodiment in FIG. 1, the SCP 20 includes a call processing module 22, a route performance collector 24, a score manager module 26, a route optimizer module 28, and a logger module 32. The SCP 20 may comprise a processor running a software program, in which the various modules comprise software modules. Alternatively, the modules may comprise individual components which perform the various functions. The SCP 20 also includes a performance metrics database 34, a scores database 36, and a mid-term metrics database 38, which may be implemented in separate memory devices or structures. Alternatively, the databases 34, 36, 38 may comprise parts of a single memory device or structure.

The route performance collector module 24 collects trunk group metrics for every trunk group-zone combination. The zone can include a group of terminations having common attributes for which it is desirous to collect and analyze metrics. For example, the zone may include terminations within a geographic area, a community (i.e., all universities in the United States), or a service oriented group of destinations such as all mobile numbers in the United States. The metrics information collected includes: age (the number of 15 minute periods since a specific date); Trunk Group identification; Zone; attempts count; Normal Unreachable Numbers (NUN) count, (i.e., number of times user is busy and operator intervenes); Answered calls (ANS) count; User Release Incomplete (USRRLS) count (number of times ring no answer and all normal call clearing other and answered); Overflow (OVF) count (number of near end and far end releases which normally trigger route advance); Network Release Incomplete (NETRLS) count (number of near end or far end fatal codes which preclude route advance); and Post Dial Delay Increment (PDDI) introduced by a service provider in milliseconds (the chances of completing an attempt are greatly reduced the longer that an attempt is held on a service provider network without completion). For outgoing trunk groups, the performance collector module 24 additionally collects consecutive failed attempts count (this metric tracks consecutive route advance failures and is an external indication of significant network problems on a service provider) and consecutive recovery count (this metric tracks recurrent network problems on the service provider). These fields are recorded in the performance metrics database 34 which comprises a rotary buffer with a set number of records. Records are advanced in the buffer based on actual calls. Accordingly, for some trunk groups the times between adjacent records will be more than 15 minutes. Use of the older data is allowed where a specific trunk group has not been used to route recent calls.

At the end of every 15 minute time period, the score manager module 26 performs Metrics Rollover functions for those service providers that have seen at least one attempt in the last 15 minute time period. The score manager module 26 updates the score database 36 according to the results of the Metrics Rollover functions. The score database 36 includes the following fields for each trunk group: age, trunk group identifier; zone; and answer seizure ratio score (ASR); Average Call Duration (ACD) score; average PDDI (PDDI_AVG); Release and Failure Index (RAFI); overflow index (OVFI); Stability (volatility of certain metrics over time); and a score based on a function f(Stability, ASR, PDDI, ACD, OVFI, RAFI, False Answer Supervision (FAS)).

The Metrics Rollover functions include the following: calculate the age field of the metrics record that was just completed, i.e., number of 15 minute intervals from a specific date; calculate ASR scores based on the metrics ANS/attempts; capture score for ACD field from an external feed; calculate PDDI average; calculate RAFI based on metrics NETRLS/outgoing trunk group attempts; calculate OVFI based on metrics OVF/outgoing trunk group attempts; calculate stability scores (see below); calculate score based on function f(Stability, ASR, PDDI, ACD, OVFI, RAFI, FAS); produce level summary metrics for incoming and outgoing trunk groups using world zone; and log all metrics and scoring records to log files.

If there are no historical scores for a particular outgoing trunk group, then the value of stability is assigned a default value. If historical scores are available, the average score across the historical data is calculated. After calculating the average score, the following calculation is performed and summed for all historical data:

(absolute(score−average score)*weighting parameter (age−current age)).

The FAS function is used as follows. If ASR is very high and ACD is very low, then the score is significantly downweighted so that the particular outgoing trunk group is less likely to be used in dynamic routing list construction. This is done by determining whether the calculated ASR is greater than a false value and whether is ACD is less than a false value. If this analysis indicates a false value, then the FAS is given an obscene or default value which downweighs the particular trunk group.

The logging module 32 logs the metrics and scores from the short term period and saves them in the midterm metrics database 38. This mid-term database may be interrogated to determine stability as described above. In addition to the metrics and the scores, the mid-term database also stores accumulated cost information. That is, an accumulated cost over a certain time period can be stored. Alternatively, the accumulated cost information may comprise costs for each transaction which can be interrogated to determine accumulated costs for different time periods as required.

The call processing module 22 has access to a set of qualified routes passed down from a back end process, the qualified outgoing trunk group routes that have been previously scored, and the outgoing trunk group records for world zone previously scored by the scoring function (if no score exists from a particular outgoing trunk group, then the route optimizer uses scores for world zone). The back end process may comprise a Route Plan Management (RPM) 40 connected to the SCP 20. RPM 40 operates as defined in U.S. Patent Application Publication US 2004/0172265, the entire contents of which are incorporated herein by reference.

The call processing module 22 determines how to route calls using the information available. If a buyer is disabled from using dynamic routing, the dynamic routing feature is disabled, or if none of the routes have any scores, then the call processing module 22 uses the optimized rules currently loaded.

For determining whether a route has an associated score, the call processing module 22 first determines whether a score is available for a specific trunk group-zone. When no score is available at that specific level, the call processing module 22 will search higher up in the hierarchy and use a score for that trunk group at a higher level zone. For example, if there is no score for a certain trunk group with the zone including all mobile phones in France, then the call processing module 22 will look at a higher level zone including all terminations in France.

If only some of the routes have scoring, but not all of them, the call processing module 28 uses the available scores in conjunction with the unscored routes. In this case, the route optimizer module 28 sets the first route choice to the highest priority unscored route. This is followed by the set of scored routes, sorted from best to worst, then the remaining unscored routes are added to the route list in priority order. The purpose of this is to get routes scored while simultaneously taking advantage of the existing scores.

In the case where all the routes have scoring, the route optimizer module 28 sorts qualified routes in an order from best to worst scores. If the route list becomes exhausted without completing the call, the call processing module 22 retries historically good routes. More specifically, the call processing module reuses a set of routes for which PDDI<threshold value. For the routes which meet this criteria, the call processing unit is put in sleep mode for a predetermined time period, then a single route choice is sent to the switch based on the routes which meet the criteria. The number of real time call processing threads may be increased to tolerate some of them sleeping. The number of sleeping threads should be limited based on known capacity. If the number of threads reaches the limit, the call is considered as having failed to complete.

A risk management module 38 is connected to the route optimizer module 28. The risk management module 38 adjusts and reprioritizes service providers based on the cost to complete a call, accumulated costs and other mid-term metrics stored over a medium length or mid-term period in the mid-term metrics database, and long term cost objectives. The risk management module 38 generates rules which are stored in an optimized rules database 44. The optimized rules may include the above-described function used to generate the scores. The long term cost objectives may be stored in a business rules database 42. Thus, higher cost providers can be called up or brought up in priority to deal with a temporary capacity need without impacting the long term blended cost objective.

Figure 2:
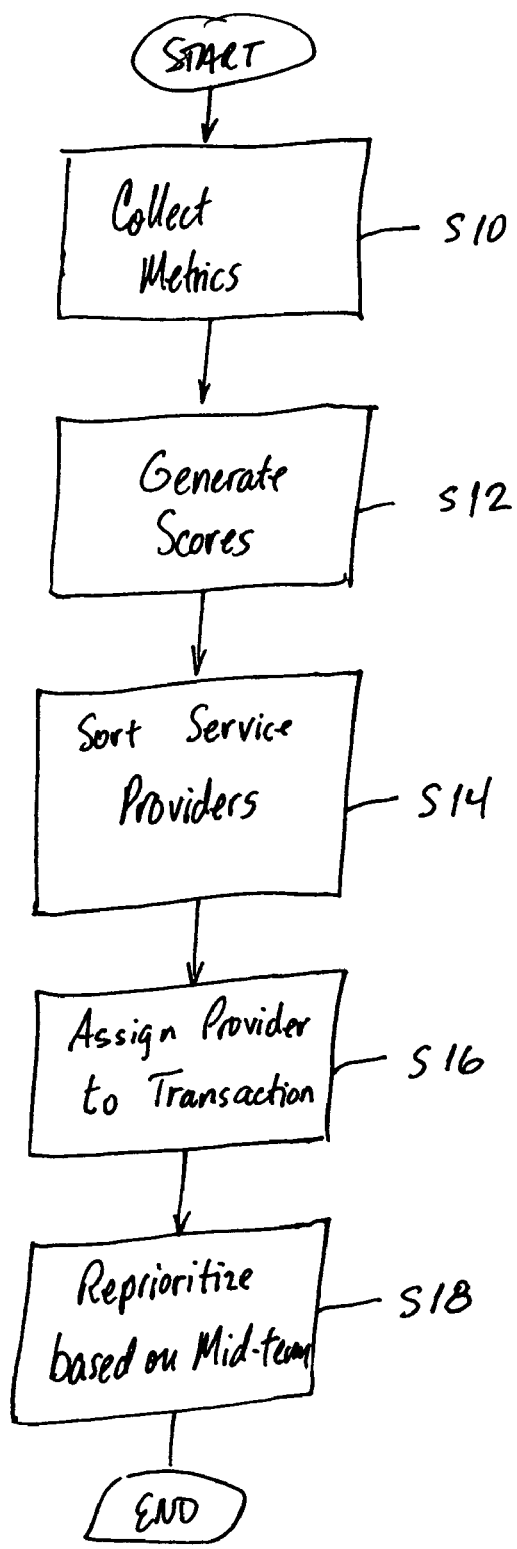
FIG. 2 is a basic flow diagram showing the steps according to an embodiment of the present invention.

FIG. 2 is a flow diagram showing the method according to an embodiment of the present invention. The performance metrics associated with the service providers are collected at step S10. The metrics are collected based on monitoring actual use of the service providers. During each short-term period, scores are generated for each service provider based on based on a function of the various metrics, step S12. Some of the metrics will have a greater effect on the overall score depending on the importance assigned to each metric. It is possible that each customer may sort the providers based on an individual function suited to the customer's requirements. Alternatively, the providers are sorted based on a common function. After the scores have been determined, the service providers are sorted by score, step S14. Transactions for customers are then assigned to the one of the available service providers with the highest score, step S16. The list of service providers is reprioritized at longer time periods than the short term periods based on mid-term metrics, i.e., historical metrics data, accumulated costs, and long term business goals S18. The reprioritization may be effected by changing the function used to generate scores in step S12.

Figure 3:
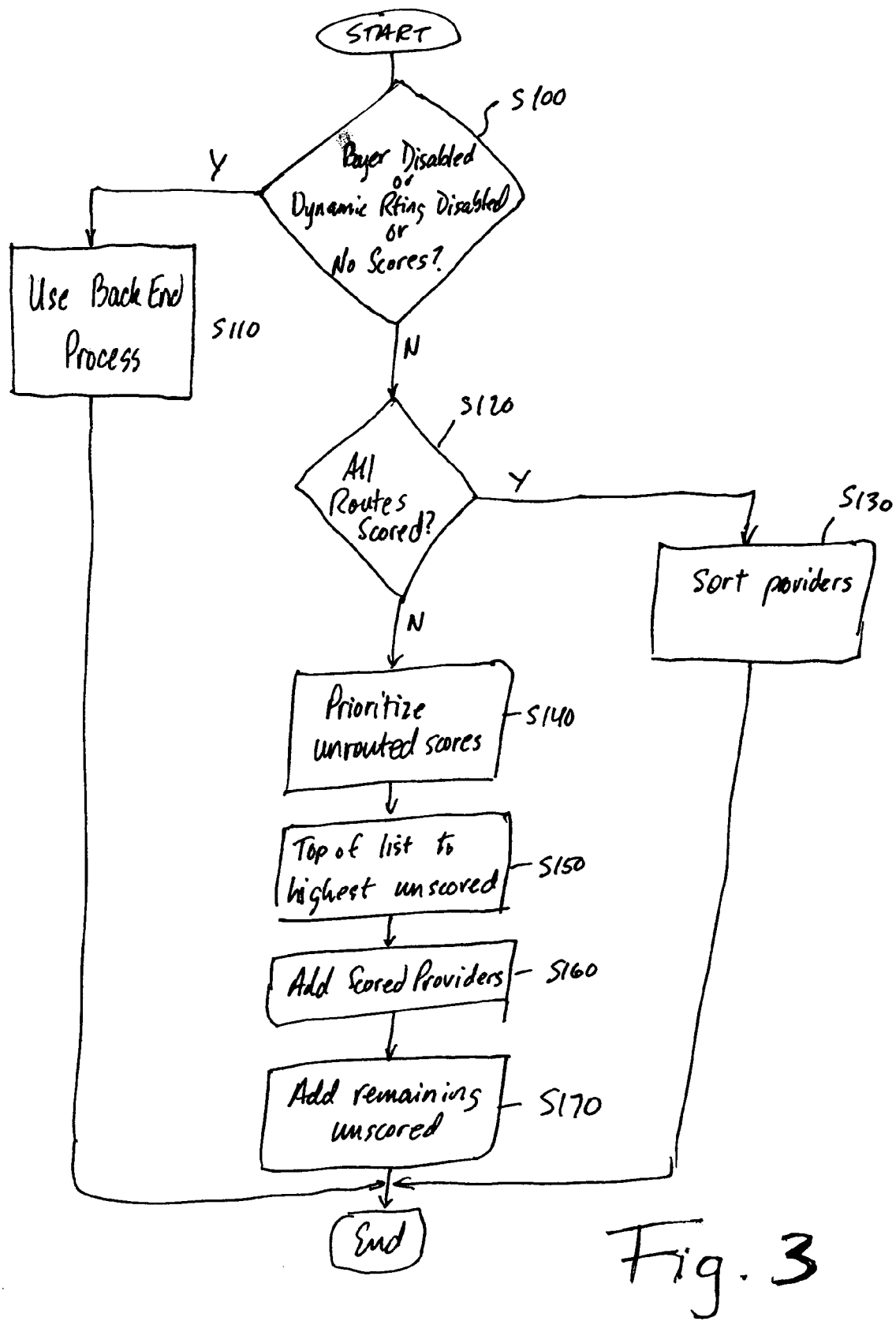
FIG. 3 is a flow diagram showing further aspects of the inventive method.
Figure 4:
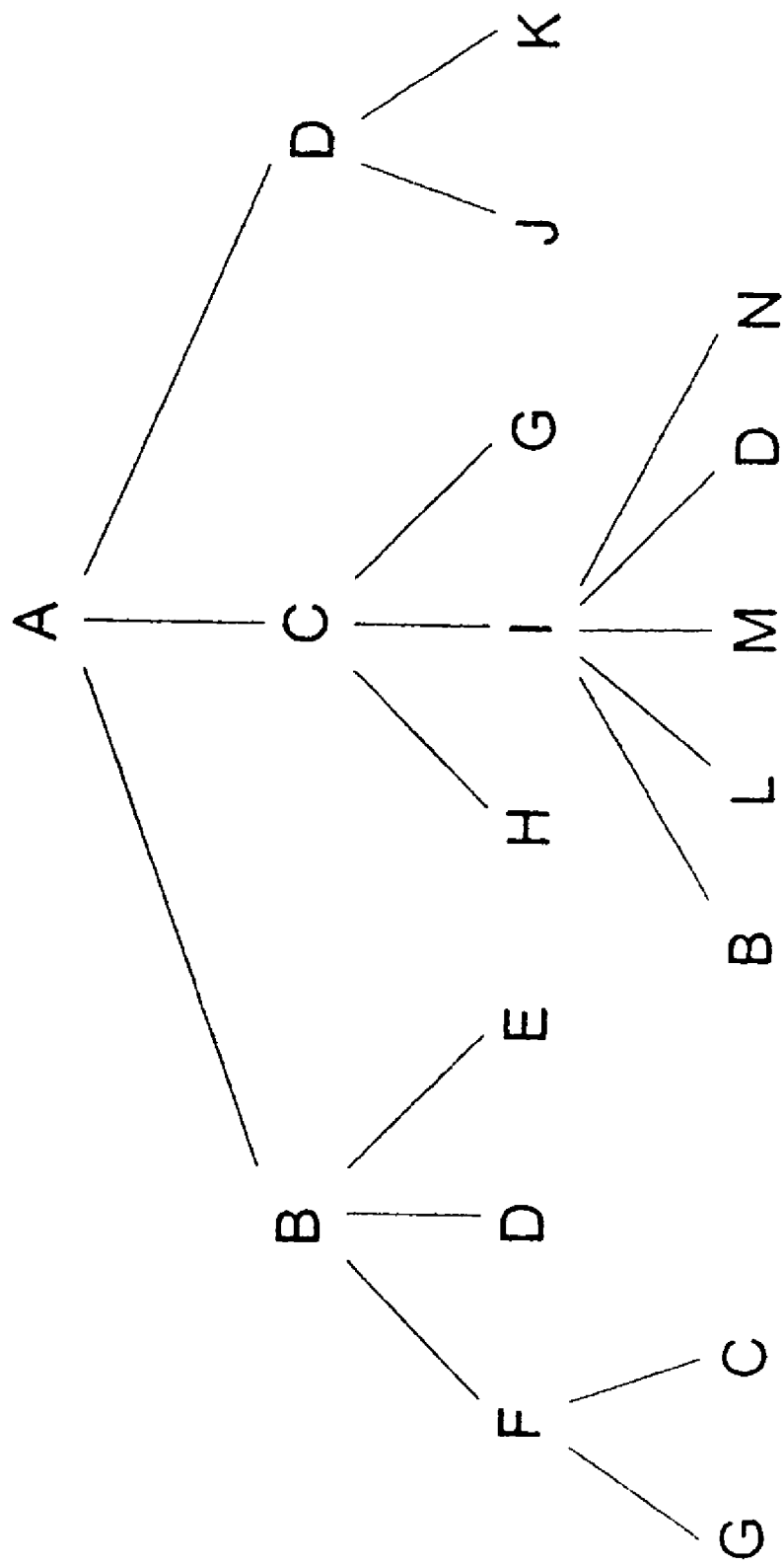
FIG. 4 is a prior art hierarchical diagram showing the relationships between service providers.

FIG. 3 is a further flow diagram showing the steps for generating a prioritized list of service providers. At step S100 is it determined whether a buyer is disabled from using dynamic routing, whether the dynamic routing feature is disabled, or whether none of the service providers have any scores. If any of these criteria are met, then a prioritized list of service providers developed by a back end process, step S110. As described above, the back end process may be performed by RPM 40. RPM 40 operates as defined in U.S. Patent Application Publication US 2004/0172265, the entire contents of which are incorporated herein by reference.

If none of the criteria are true in step S100, then it is determined whether all the service providers have an associated score, step S120. If it is determined that all service providers have a score, then the service providers are sorted in an order from best to worst scores, step S130.

If only some of the service providers have a score, but not all of them, the unscored service providers are prioritized according to the back end process, step S140. In generating the list of service providers to use, the first choice is given to the highest priority service provider with no score, step S150. This is followed by the set of scored service providers, sorted from best to worst, step S160. The remaining unscored service providers are added to the list in priority order, step S170. The purpose of this is to get routes scored while simultaneously taking advantage of the existing scores.

For telecommunications calls, the performance metrics associated with each of a plurality of service providers comprise metrics for incoming and outgoing trunk groups associated with each of the plurality of service providers. In this specific embodiment for telecommunications calls, generating a score comprises generating scores for each trunk group in combination with a zone. As described above, the zone includes or defines a group of terminations having common attributes for which it is desirous to collect and analyze metrics. The zones are hierarchical such that if a score is not available for a specific trunk group at a specific level, the score for a higher level zone for that trunk group is used during said step of sorting.

If the list of service providers becomes exhausted without completing the transaction, historically good service providers are retried. In the specific embodiment of call processing, a set of routes is generated for which PDDI<threshold value is true. For the routes which meet this criteria, the call processing unit is put in sleep mode for a predetermined time period, then a single route choice is sent to the switch based on the routes which meet the criteria. The number of real time call processing threads may be increased to tolerate some of them sleeping. The number of sleeping threads should be limited based on known capacity. If the number of threads reaches the limit, the call is considered as having failed to complete.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for managing transactions across a large number of service providers, wherein the transactions are telecommunication calls, the method comprising the steps of:
    determining performance metrics associated with each of a plurality of service providers, the performance metrics associated with each of a plurality of service providers comprising metrics for incoming and outgoing trunk groups associated with each of the plurality of service providers;
    generating a score for each service provider based on the performance metrics associated with each of the plurality of service providers taken over a short term period by generating scores for each trunk group in combination with a zone, wherein the zone includes a specific group of destinations;
    sorting the service providers based on the scores to generate a list of service providers, wherein the zones are hierarchical such that if a score is not available for a specific trunk group at a specific level, the score for a higher level zone for that trunk group is used during said step of sorting;
    assigning a customer transaction to one of the service providers based on the order of the list of service providers; and
    reprioritizing the service providers based on mid-term metrics and accumulated costs taken over a mid-term period that is longer than the short term period.

2. The method of claim 1, wherein said step of determining performance metrics is performed continuously by monitoring actual transactions.

3. The method of claim 1, wherein the step of reprioritizing comprises changing a function used for generating the scores.

4. The method of claim 1, wherein the step reprioritizing is further based on long term business goals.

5. The method of claim 1, wherein the short term period is 10-15 minutes and the mid term period is 3-5 hours.

6. The method of claim 1, wherein said step of sorting the service providers comprises determining whether all of the service providers have scores; and
    if it is determined that not all of the service providers have scores, then prioritizing the service providers without scores based on optimized rules; setting the one of the service providers without scores having the highest priority to the first position in the list; adding the service providers with scores to the list from the highest score to the lowest score after the first position; and then adding any remaining one of the service providers without scores after the service providers with scores.

7. The method of claim 1, wherein said step of assigning a service provider comprises successively attempting the transaction with service providers in the list until the transaction is completed by one of the service providers.

8. The method of claim 7, wherein, if the list is exhausted without completing the transaction, then retrying the transaction with a subset of service providers having a historical metric which meets a predetermined criteria.

9. The method of claim 1, wherein said steps of determining, generating, sorting, and assigning are accomplished by a service control point that is connected to a switching point, wherein said step of assigning is effected by the switching point.

10. The method of claim 1, wherein the score is based on a function of a plurality of the performance metrics, wherein the performance metrics are weighted differently according to the function.

11. A signal control point connected to a signal transfer point, the signal transfer point connected to a plurality of service providers and customers, said signal control point comprising:
- a performance collector module configured to monitor transactions performed by service providers through the signal transfer point and collect performance metrics associated with the service providers during the transactions, wherein the transactions are telecommunication calls and the performance metrics associated with each of a plurality of service providers comprising metrics for incoming and outgoing trunk groups associated with each of the plurality of service providers;
- a score manager module configured to periodically generate a score for the service providers based on the collected metrics for every short time period by generating scores for each trunk group in combination with a zone, wherein the zone includes a specific group of destinations;
- an optimizer module configured to generate an ordered list of the service providers based on the scores, wherein the zones are hierarchical such that if a score is not available for a specific trunk group at a specific level, the score for a higher level zone for that trunk group is used during said step of sorting; and
- a processing module configured to assign transactions to one of the service providers based on the list.

12. The signal control point of claim 11, comprising a performance metrics database storing said collected metrics and a score database storing said scores.

13. The signal control point of claim 12, further comprising a mid-term metrics database storing historical metrics data.

14. The signal control point of claim 13, further comprising a risk manager module configured to reprioritize said list of service providers based on the historical metrics data and on accumulated costs for a time period, whereby a mixture of high performing and low performing service providers are used to achieve long term goals.

15. The signal control point of claim 11, wherein said optimizer module is a route optimizer module for determining call routes and said processing module is a call processing module and is configured to assign call routes through service providers.

16. The signal control point of claim 11, wherein the score is based on a function of a plurality of the performance metrics, the performance metrics being weighted differently according to the function.

17. A method for managing transactions across a large number of service providers, comprising the steps of:
- determining performance metrics associated with each of a plurality of service providers;
- generating a score for each service provider based on the performance metrics associated with each of the plurality of service providers taken over a short term period;
- sorting the service providers based on the scores to generate a list of service providers;
- assigning a customer transaction to one of the service providers based on the order of the list of service providers; and
- reprioritizing the service providers based on mid-term metrics and accumulated costs taken over a mid-term period that is longer than the short term period,
- wherein said step of sorting the service providers comprises determining whether all of the service providers have scores; and
- if it is determined that not all of the service providers have scores, then prioritizing the service providers without scores based on optimized rules; setting the one of the service providers without scores having the highest priority to the first position in the list; adding the service providers with scores to the list from the highest score to the lowest score after the first position; and then adding any remaining one of the service providers without scores after the service providers with scores.

18. A method for managing transactions across a large number of service providers, comprising the steps of:
- determining performance metrics associated with each of a plurality of service providers;
- generating a score for each service provider based on the performance metrics associated with each of the plurality of service providers taken over a short term period;
- sorting the service providers based on the scores to generate a list of service providers;
- assigning a customer transaction to one of the service providers based on the order of the list of service providers wherein said step of assigning a service provider comprises successively attempting the transaction with service providers in the list until the transaction is completed by one of the service providers, and if the list is exhausted without completing the transaction, then retrying the transaction with a subset of service providers having a historical metric which meets a predetermined criteria; and
- reprioritizing the service providers based on mid-term metrics and accumulated costs taken over a mid-term period that is longer than the short term period.

\* \* \* \* \*